DIGITAL SQUELCH SYSTEM

Filed Aug. 8, 1966

INVENTOR
John N. Warfield

BY Novey, Schmidt, Johnson & Novey
ATTORNEYS.

3,437,937

DIGITAL SQUELCH SYSTEM

John N. Warfield, Lawrence, Kans., assignor to Wilcox Electric Company, Inc., Kansas City, Mo., a corporation of Kansas Filed Aug. 8, 1966, Ser. No. 570,889
Int. Cl. H04b *1/10, 1/16*
U.S. Cl. 325—478 12 Claims

ABSTRACT OF THE DISCLOSURE

A digital squelch system determining and comparing the number of oscillations of a received signal during a particular time interval with a similar determination made over a different time interval of the same duration. The comparison is effected by subtraction to obtain intelligence indicative of whether a desired transmission or noise forms the primary component of the received signal.

This invention relates to apparatus for executing a control function in response to the frequency characteristics of an oscillatory electrical signal and, in particular, to apparatus for squelching the output of a communications receiver in response to a digital determination that noise, rather than a desired transmission, comprises the primary component of a received signal.

In communication receivers it is desirable in many applications that the output from the receiver be suppressed at all times except during reception of a desired transmission. For example, in an aircraft the pilot does not want the receiver to be making noise when it is monitoring a particular communications frequency, since the noise is irritating and interferes with normal voice conversation in the cockpit. For this reason, a squelch circuit is commonly employed in many communications receivers. Ideally, the squelch circuit turns on the audio portion of the receiver when a desired signal is received, and turns off the audio at all other times.

Heretofore, squelch circuits have operated primarily in an analogue manner to effect a distinction between a desired signal and interference. The distinction may be made on the basis of the amplitude appearing at the squelch input, or by a comparison of the outputs of linear filters. In any event, analogue squelch circuits require the use of inductive components as a part of tuned circuits or filters which inherently add to the bulk of the receiver. Manifestly, in aircraft communications equipment, the size and weight of the apparatus is an important design consideration.

It is, therefore, the primary object of this invention to provide a squelching system adaptable to microcircuitry and hence very compact as compared with prior art squelch circuitry.

As a corollary to the foregoing object, it is an important aim of this invention to provide a squelch system which operates in a digital manner to discriminate between desired transmissions and undesired noise without employing bulky inductive components.

Additionally, an important object of the instant invention is to provide control apparatus utilizing digital determination concepts which may be employed in control applications where a determination between oscillatory signals of regularly or irregularly periodic nature must be effected.

A specific object of the invention is to provide a digital squelch system as aforesaid wherein the number of oscillations of a received signal during a particular time interval is determined and compared with a similar determination made over a different time interval of the same duration, and wherein such comparison is effected by subtracting the two determinations to obtain intelligence indicative of whether a desired transmission or noise forms the primary component of the received signal.

Furthermore, it is an object to provide a system as set forth in the preceding object wherein the possibility of an erroneous indication is obviated by repeating the oscillation determining and subtracting functions a number of times and then totalizing the various differences obtained.

Figure 1:
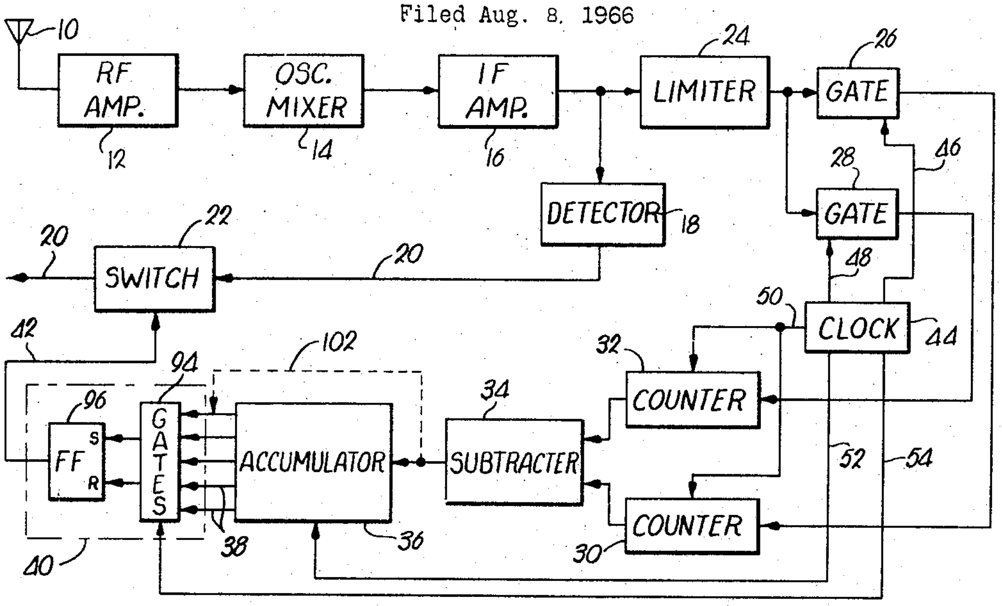
FIGURE 1 is a block diagram of the digital squelch system.

In FIG. 1, a receiving antenna 10 is shown connected to the front end of an AM receiver of the conventional superheterodyne type. Antenna 10 feeds an RF amplifier 12 which, in turn, drives an oscillator mixer 14. The intermediate frequency signal appearing at the output of stage 14 is fed to an IF amplifier 16, the amplified signal being demodulated by a detector 18 having an audio frequency output represented at 20. A switch 22 is interposed in series with the detector output 20, such switch comprising any of a number of conventional, electrically responsive switching arrangements such as a transistor switching circuit. Output 20 may be connected directly to headphones or to an audio amplifier preceding a speaker.

The remainder of the apparatus illustrated in FIG. 1 comprises a digital squelch system of the instant invention. Besides detector 18, IF amplifier 16 also feeds the intermediate frequency signal to an amplitude limiter 24 where the amplitude modulation is removed. A pair of gates 26 and 28 control the delivery of the signal from the limiter output to a pair of pulse counters 30 and 32. The outputs of the two counters 30 and 32 are connected to the inputs of a subtracter network 34 which, in turn, feeds information to an accumulator 36. The accumulator output is represented by five digital leads 38 connected to the input of a decoder 40 which controls the operative state of switch 22 via connection 42. Operation of the various subassemblies of the logic is controlled by a clock 44 which generates clock pulses in a time sequence illustrated in FIG. 2 and described hereinafter. Note that clock 44 is connected to gates 26 and 28 as illustrated at 46 and 48 respectively, the clock being connected to counters 30 and 32, accumulator 36, and decoder 40 as represented at 50, 52 and 54 respectively.

Figure 2:
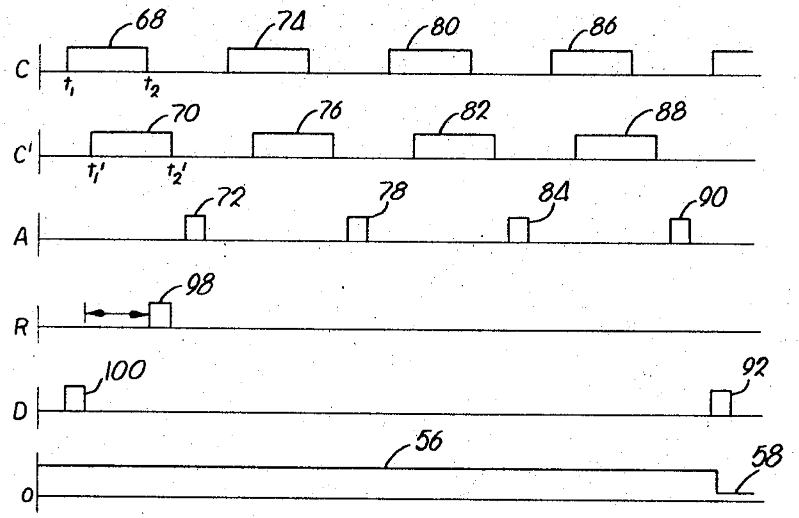
FIG. 2 illustrates six time related graphs showing the clock pulses which operate the system and the decoder output.

The uppermost graph of FIG. 2 designated C illustrates a series of clock pulses of equal duration and represents the pulses delivered to gate 26 via connection 46. The positive pulses correspond to turn-on of gate 26, the latter normally providing an open circuit between limiter 24 and counter 30. Similarly, the positive pulses of the second graph C′ control turn-on of gate 28 via connection 48 to, in turn, close the circuit between limiter 24 and counter 32 for time periods corresponding to the duration of such pulses.

The third graph A shows the clock pulses delivered to counters 30 and 32 by connections 50, such pulses controlling output gates within the counters that cause the latter to deliver information to subtracter 34. The fourth graph R shows a reset function which occurs once during each cycle of operation of the apparatus. Graph D shows a clock pulse employed once during each cycle to activate the decoder output and change the state of switch 22 or maintain the latter in the same state, depending upon the information developed during the preceding cycle. The last graph illustrates a positive voltage level 56 which is shown abruptly decreasing to a second, substantially lower voltage level 58 during delivery of a clock pulse which activates decoder 40. Voltage levels 56 and 58 represent the two possible output conditions of decoder 40 which appear at connection 42 and are utilized as control commands to operate switch 22.

Figure 3:
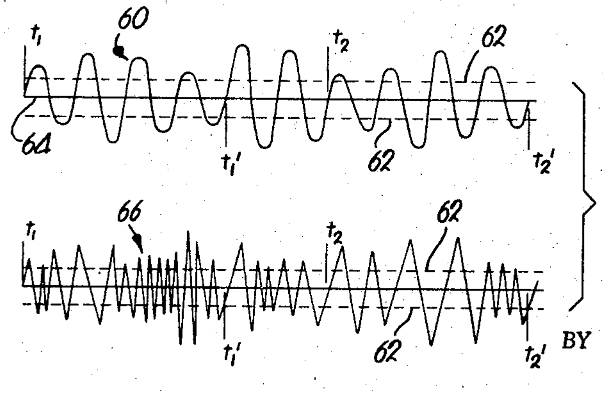
FIG. 3 illustrates two wave forms to provide a comparison between the periodic characteristics of an amplitude modulated carrier wave and noise.

In FIG. 3, an amplitude modulated wave 60 is shown, the amplitude limiting level of limiter 24 being superimposed on the diagram and illustrated by a pair of broken lines 62 spaced equal ordinate distances from the zero axis 64. The abscissa represents time, two intervals $t_1$–$t_2$ and $t_1'$–$t_2'$ being of particular interest. Additionally, a wave form 66 representing background or impulsive noise is shown for the same time intervals as above and in association with the limiter levels 62.

Before the apparatus is described in further detail and the operation thereof set forth, attention is directed to the wave forms shown in FIG. 3. If it is assumed that signal 60 represents an incoming signal appearing at antenna 10, then, in the absence of interfering signals, the audio output from detector 18 will contain the modulation impressed upon the carrier. This modulation, of course, is desired to be heard by the listener; therefore, switch 22 should be closed. On the other hand, in an effective squelch system, an incoming signal whose primary component is represented by noise 66 should not be heard by the listener, and switch 22 should be open.

In order for the system to determine whether to open or close switch 22, a sampling of the periodic characteristics of the incoming signal is made. This is best understood by considering the oscillations of the carrier wave over the periods $t_1$–$t_2$ and $t_1'$–$t_2'$. In each period, six oscillations of the carrier occur because the two periods are of equal duration and the carrier is of a constant frequency. Even if the carrier wave were frequency modulated instead of amplitude modulated, in practice, the number of oscillations over a finite interval of fixed duration would be substantially the same each time the signal is sampled since the maximum swing of the modulating frequency would be quite small as compared with the carrier frequency of the signal. It should be understood that FIG. 3 is only illustrative in this respect since, for time intervals of even a few milliseconds' duration, the number of cycles of the carrier wave could well number in the thousands, depending upon the intermediate frequency of the receiver.

A similar study of the noise wave form 66 reveals that 19 oscillations occur during the interval $t_1$–$t_2$, while only approximately 12 oscillations occur during the interval $t_1'$–$t_2'$. The difference is due to the time varying instantaneous frequency characteristic of noise. In the instant invention, pulse counters 30 and 32 effectively count the number of oscillations of a received signal during a number of intervals of equal duration, whereupon subtracter 34 determines the difference between the count figures obtained for two successive intervals. Difference determinations are successively accumulated in the accumulator 36 during a cycle of operation of the apparatus, it being clear that, if a desired transmission forms the primary component of the received signal, the digital output of the accumulator will be low in value since the only frequency difference discernible by subtracter 34 will be due to transmitter drift and drift in the receiver oscillator. Contrariwise, the presence of noise as the primary component of the received signal will raise the accumulator output, decoder 40 being responsive to the accumulator output level in a manner to squech the receiver when the level is greater than a predetermined value, and permit normal operation of the receiver when the accumulator output is less than such value.

The details of the operation of the apparatus are best understood wtih reference to FIGS. 1 and 2. During receiver operation, the output of limiter 24 is constantly delivered to gates 26 and 28 but flows therethrough to counters 30 and 32 only during time intervals corresponding to the clock pulses illustrated in graphs C and C'. When pulse 68 is delivered to gate 26 via connection 46, gate 26 closes the circuit between the limiter output and the input of counter 30 between the times $t_1$ and $t_2$. Each counter is a conventional pulse counter that counts or registers in response to a positive-going wave front; therefore, each positive half cycle of the incoming signal increases the count by one. Limiter 24 serves a shaping function and, as stated previously removes the amplitude modulation from the incoming signal that is present either in the form of intelligence, in the case of an AM transmission, or in the form of undesired amplitude modulation present on an incoming FM signal.

Counter 32 is operated during an interval $t_1'$–$t_2'$ as illustrated by pulse 70 in graph C' applied to gate 28. Although the two time periods $t_1$–$t_2$ and $t_1'$–$t_2'$ are illustrated as overlapping, this is not critical to the performance of the apparatus and, in fact, it is evident that too great a degree of coextensiveness of the two intervals would impair the accuracy of the determination.

Pulse 72 is delivered by clock 44 after time $t_2'$ to simultaneously gate the outputs of counters 30 and 32 and cause the information contained in the counters to be delivered to the inputs of subtracter 34. In practice, the actual connections between the counters and subtracter 34 could take the form of binary coded digital leads, the subtracter being a conventional binary logic network capable of differencing two independent digital inputs and delivering a difference determination at its output.

It will be appreciated that, as subsequent clock pulses 74, 76 and 78, 80, 82 and 84, and 86, 88 and 90 are delivered to the gates 26 and 28 and the counters, accumulator 36 will add the successively received difference determinations from subtracter 34 to provide digital output intelligence that comprises a running total of the difference determinations. In the system illustrated, four samplings of the incoming signal are made; thereafter, a clock pulse 92 is produced which is delivered to decoder 40 via connection 54. The decoder output at this instant will then remain at its previous level or change to a second level, depending upon the intelligence received from accumulator 36.

In the example illustrated, the decoder output is shown changing from the level 56 to the level 58 during the time that clock pulse 92 exists. This causes a change-of-state of switch 22 from, for example, an open condition (suppressing the receiver output) to a closed condition permitting the listener to hear the incoming signal. Decoder 40 is set at a minimum squelch value and, when the intelligence from accumulator 36 exceeds this value, switch 22 is commanded to open or remain open if already in the open condition. Conversely, accumulated differences of less than the minimum squelch value cause the decoder output to effect closure of switch 22 or maintain the switch in the closed condition if previously closed. Therefore, it may be seen that, depending upon the value selected, the receiver will remain squelched until the primary component of the received signal has less than a preselected amount of frequency irregularities.

In order to effect the control function just described, decoder 40 comprises standard digital logic elements including gates illustrated at 94 which receive the accumulator output, and a bistable multivibrator or flip-flop 96 controlled by gates 94 and presenting its output to connection 42. Decoder gates 94 determine whether or not the accumulator count exceeds the established minimum, while flip-flop 96 serves to retain this determination throughout the following count cycle. As may be seen from the graph of the decoder output (which is delivered by flip-flop 96), a change of the output level of the decoder output may occur only at the close of each count cycle when clock pulse 92 is delivered to gates 94.

More specifically, flip-flop 96 is of the set-reset type, the set control input being designated S in the drawing, while the reset control input is labeled R. When clock pulse 92 arrives at gates 94, it passes through the gates and is delivered to the set input if the accumulator count exceeds the selected minimum squelch value. If the flip-flop was not set at the close of the preceding count cycle, it changes state and delivers the high level output illustrated at 56 in FIG. 2. On the other hand, if the accumulator count does not exceed the minimum squelch value, gates 96 route the clock pulse to the reset input of the flip-flop, causing the output thereof to assume the level indicated at 58. It is evident that, if the flip-flop was previously reset by the preceding count cycle, then it would merely remain at output level 58. Therefore, unless there is a change in the frequency characteristics of the incoming signal sufficient to raise the accumulator output from a value below the minimum squelch value to a level above the minimum value, or lower the accumulator output from a value above the minimum squelch value to a level below such value, the flip-flop output remains unchanged. The minimum squelch value would be determined in accordance with the signal strength desired to remove the squelch from the receiver output; manifestly, the lower the minimum squelch value the higher the required strength of the incoming carrier to remove the squelch. This is because a higher signal to noise ratio will have to be sensed by the system in the form of lesser deviations in the number of counts registered by counters 30 and 32 during the various counting intervals.

In order to clear the system at the end of each operating cycle, a reset pulse 98 is produced by clock 44 and delivered to accumulator 36 via connection 52. This clears the accumulator memory and readies the system for the next cycle. As illustrated in FIG. 2, pulse 98 may occur any time prior to pulse 72 and subsequent to a pulse to the decoder illustrated at 100, the latter being the decoder timing pulse produced at the close of the previous operating cycle.

In applications where the possibility of an undesired and a desired signal component having substantially the same number of oscillations in a given time interval is either nonexistent or sufficiently unlikely to be acceptable, the above-described system may be simplified, if desired, by eliminating the accumulator and directly connecting the output of subtracter 34 to the decoder gates 94 as illustrated in FIG. 1 by the broken line 102. A timing pulse such as shown at 92 and 100 would then be applied to gates 94 subsequent to each of the pulses 72, 78, 84 and 90 to effect a squelch or no squelch determination after each operation of subtracter 34.

Having thus described the invention, what is claimed as new and desired to be secured by Letters Patent is:

1. Apparatus for determining whether the primary component of an oscillatory input signal has a regular or an irregular period, and for initiating a control function in response to such determination, said apparatus comprising:

means responsive to said signal for deriving information indicative of the number of oscillations of the signal occurring during each of a pair of time intervals of equal duration, whereby said information contains a pair of information elements each representing the number of oscillations in a respective interval;

subtracter means coupled with said deriving means and responsive to said elements for determining the difference therebetween; and means coupled with said subtracter means and responsive to the output thereof for producing a first control command when said difference exceeds a predetermined value indicative of the presence of an irregularly periodic wave as the primary component of said signal, and for producing a second control command when said difference is less than said value and hence corresponds to the presence of a regularly periodic wave as said primary component.

2. The invention of claim 1, said deriving means including means for counting a recurring electrical characteristic of said signal during each of said intervals to thereby derive said elements.

3. The invention of claim 1, said deriving means including a pulse counter for counting half cycles of said signal of predetermined polarity to thereby produce said information elements.

4. In a communications receiver, apparatus for squelching the output of the receiver except when a desired transmission is the primary component of a received signal, said apparatus comprising:

means responsive to said signal for deriving information indicative of the number of oscillations of the signal occurring during each of a pair of time intervals of equal duration, whereby said information contains a pair of information elements each representing the number of oscillations in a respective interval;

subtracter means coupled with said deriving means and responsive to said elements for determining the difference therebetween; and means coupled with said subtracter means and responsive to the output thereof for suppressing the receiver output when said difference exceeds a predetermined value indicative of the presence of noise as the primary component of said signal.

5. The invention of claim 4, said deriving means including means for counting a recurring electrical characteristic of said signal during each of said intervals to thereby derive said elements.

6. The invention of claim 4, said deriving means including a pulse counter for counting half cycles of said signal of predetermined polarity to thereby produce said information elements.

7. The invention of claim 4, said receiver output suppressing means including means for producing a first control command when said difference exceeds said value and a second control command when said difference is less than said value, and control means operable by said commands for effecting said receiver suppression in response to production of said first command, and permitting normal receiver operation in response to production of said second command.

8. In a communications receiver, apparatus for squelching the output of the receiver except when a desired transmission is the primary component of a received signal, said apparatus comprising:

means responsive to said signal for deriving information indicative of the number of oscilaltions of the signal occurring during each of a series of time intervals of equal duration, whereby said information contains a plurality of information elements each representing the number of oscillations in a respective interval;

subtracter means coupled with said deriving means and responsive to said elements for determining the difference between each of at least two pairs of said elements, whereby to provide a plurality of difference determinations;

accumulator means coupled with said subtracter means and responsive to said determinations for adding the latter to provide intelligence representing the total thereof; and means coupled with said accumulator means and responsive to said intelligence for suppressing the receiver output when the intelligence exceeds a predetermined value indicative of the presence of noise as the primary component of said signal.

9. The invention of claim 8,
said deriving means including limiter means for converting said signal into a series of pulses of equal amplitude, and a pulse counter operable in response to said pulses for producing said information elements.

10. The invention of claim 8,
each of said pairs of elements representing the number of oscillations in a corresponding pair of successively occurring intervals,
said deriving means sequentially delivering said pairs of elements as corresponding successive pairs of intervals elapse,
said subtracter means providing said difference determinations in succession in response to delivery of said pairs of elements.

11. The invention of claim 10,
said output suppressing means being operable to effect said receiver suppression after delivery of the pair of elements corresponding to the last pair of intervals of said series.

12. The invention of claim 8,
said output suppressing means including means for producing a first control command when said intelligence exceeds said value and a second control command when said intelligence is less than said value, and control means operable by said commands for effecting said receiver suppression in response to production of said first command, and permitting normal receiver operation in response to production of said second command.

References Cited

UNITED STATES PATENTS 3,325,738 6/1967 Busby ---------- 325—478 XR

WILLIAM C. COOPER, *Primary Examiner.*

B. P. SMITH, *Assistant Examiner.*

U.S. Cl. X.R.

325—321